No. 693,031. Patented Feb. 11, 1902.
J. KENNEDY.
ROLLING MILL.
(Application filed Feb. 17, 1899.)
(No Model.)
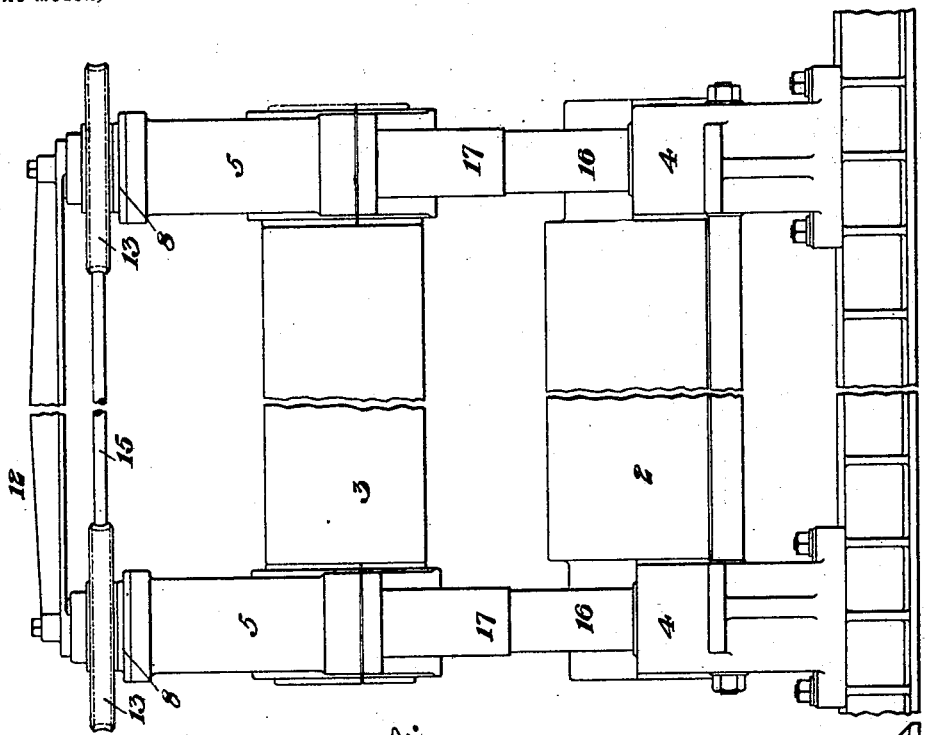
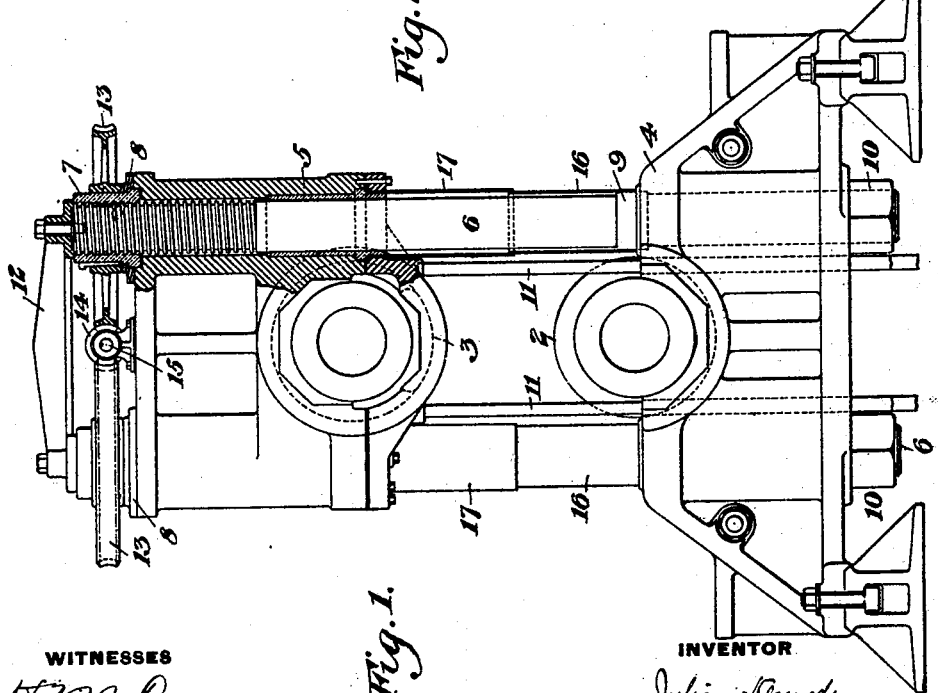
WITNESSES
INVENTOR
THE NORRIS PETERS CO., PHOTO-LITHO., WASHINGTON, D. C.

UNITED STATES PATENT OFFICE.

JULIAN KENNEDY, OF PITTSBURG, PENNSYLVANIA.

ROLLING-MILL.

SPECIFICATION forming part of Letters Patent No. 693,031, dated February 11, 1902.

Application filed February 17, 1899. Serial No. 705,796. (No model.)

*To all whom it may concern:*

Be it known that I, JULIAN KENNEDY, of Pittsburg, in the county of Allegheny and State of Pennsylvania, have invented a new and useful Improvement in Rolling-Mills, of which the following is a full, clear, and exact description, reference being had to the accompanying drawings, forming part of this specification, in which—

Figure 1 is an end elevation, partly in section, of a rolling-mill constructed in accordance with my invention; and Fig. 2 is a front elevation of the same.

My invention relates to rolling-mills, and more particularly to those employed for rolling heavy plates of metal, such as armorplate; and it consists in a new and improved construction of the housings, each of which is made in separate parts, and in the connections between the housing parts and the means for adjusting the rolls.

In the drawings, 2 represents the lower, and 3 the upper, roll of a two-high mill, each housing of which is composed of two separated portions 4 and 5. The base portion 4 is suitably secured to the foundation by bolts, as shown, or any other desirable means and contains the end bearing for the lower roll. The upper portion 5 of each housing is connected to the lower portion by large stay-bolts 6, the upper portions of which are screw-threaded and engage nuts 7, rotatably secured within the upper part of the housing by recessed collars 8, secured upon the top of the housing. Each stay-bolt is provided with an integral collar 9, which seats within a recess in the upper part of the lower housing portion, and each bolt is drawn down into place by a nut 10 at its lower end. The upper roll is mounted in suitable stationary bearings in the upper part of each housing, the adjusting of this roll being accomplished by moving the upper portions of the housings instead of, as heretofore, by adjusting the bearings within the housings. The weight of the upper portions of the housings is supported by the nuts 7, and these parts, together with the upper roll, are preferably counterbalanced by weights mounted upon lever-arms having rods 11 extending to the bearings of the upper roll. The upper ends of the four stay-bolts are connected by a spider 12, having arms secured to each bolt, and to each of the nuts 7 is keyed a worm-wheel 13, each pair of worm-wheels being engaged by an intermediate worm 14, which is splined upon the common shaft 15, extending across the tops of the housings and mounted in suitable bearings thereon. As each worm is splined to this shaft, it may be slid endwise thereon to adjust one end of the roll relative to the other when necessary. When the worm-shaft is rotated, the upper roll, together with the upper parts of the housing, will be raised or lowered to give the desired adjustment. The bushings 16 are preferably placed about the bolts within the upper parts of the housings, and the parts of the bolts between the housing-halves are protected by the telescopic casing-sections 17, which slide over each other in adjusting the rolls and shield the bolt from the heat and water.

The advantages of my invention will be apparent to those skilled in the art, since the housings may be made in two or more separated parts, thus reducing the size of the castings necessary, while the weight of the housings themselves may be reduced. It will be noticed that the strain during rolling is communicated to the stay-bolts and places the same in tension. The connecting-bolts themselves are utilized as a part of the adjusting mechanism for the rolls, and the bearings for the upper roll may be stationary in the upper parts of the housings.

Many changes may be made in the form and arrangement of the portions of the housings and in their connection without departing from my invention, since

I claim—

1. A rolling-mill having housings, each having an upper part in the form of a cross-head, bearings for the upper roll supported on said cross-heads, bolts connecting the upper cross-head portions with the lower parts of the housings and forming the sole support for the upper roll, and adjusting mechanism for simultaneously adjusting the upper cross-heads and the roll carried thereby positively toward and from the lower roll; substantially as described.

2. A rolling-mill having end housings, each having a separated upper cross-head portion, bearings for the upper roll supported on said cross-heads, bolts extending through said cross-heads on each side of the roll-bearing and connected to the base portions of the housings, and adjusting mechanism for simultaneously adjusting the upper cross-head portions and the upper roll carried thereby positively toward and from the lower roll; substantially as described.

3. A rolling-mill having end housings, each having an upper part in the form of a crosshead, bearings for the upper roll supported on said cross-heads, tension-bolts extending through said cross-heads and through the base portions of the housings, and constituting the entire connection between them, and adjusting mechanism, of which the bolts are members, arranged to simultaneously adjust the upper cross-head portions and the upper roll carried thereby positively toward and from the lower roll; substantially as described.

4. A rolling-mill having at each end, crosshead portions supporting the bearings for the upper roll, bolts extending through said crossheads and secured to the housings for the lower roll, said bolts supporting the upper cross-heads, nuts rotatably connected with the cross-heads and engaging screw-threaded portions of said bolts above the cross-heads, and means for operating the nuts simultaneously, whereby the upper roll is moved positively toward or from the lower roll; substantially as described.

5. A rolling-mill having the upper part of each housing made of a separate cross-head supporting the upper-roll housing, with bolts extending through it on each side of the bearing and secured to the lower part of the housings, said bolts forming the sole support for the cross-heads and upper roll, nuts engaging the screw-threaded portions of the bolts and arranged to move the upper roll positively in both directions, gear connections for operating the nuts simultaneously, and mechanism for adjusting one end of the roll relatively to the other; substantially as described.

6. A rolling-mill having housings made in separate parts connected by bolts, said bolts forming the sole support for the upper roll, nuts engaging screw-threaded portions of the bolts, and worm-gear arranged to simultaneously operate the nuts and thereby adjust the upper parts of the housings; substantially as described.

7. A rolling-mill having housings made in separate parts connected by bolts, said bolts fixing the position of the upper roll both vertically and laterally, nuts engaging screwthreaded portions of the bolts, connected worm-gearing arranged to simultaneously operate the nuts and thereby adjust the upper parts of both housings, and mechanism for adjusting one end of the roll relatively to the other; substantially as described.

8. A rolling-mill having housings made in separate parts and connected by bolts, means for adjusting one part of the housing relatively to the other, and telescopic casing-sections surrounding and protecting the bolts between the housing portions; substantially as described.

In testimony whereof I have hereunto set my hand.

JULIAN KENNEDY.

Witnesses:
H. M. CORWIN,
C. BYRNES.